(12) United States Patent
Rockstroh et al.

(10) Patent No.: US 11,801,633 B2
(45) Date of Patent: Oct. 31, 2023

(54) APPARATUSES FOR CONTINUOUSLY REFRESHING A RECOATER BLADE FOR ADDITIVE MANUFACTURING INCLUDING A BLADE FEED UNIT AND ARM PORTION

(71) Applicant: General Electric Company, Schenectady, NY (US)

(72) Inventors: Todd Jay Rockstroh, Cincinnati, OH (US); Zachary David Fieldman, Hamilton, OH (US); Theodore Anderson, West Chester, OH (US)

(73) Assignee: General Electric Company, Schenectady, NY (US)

( * ) Notice: Subject to any disclaimer, the term of this patent is extended or adjusted under 35 U.S.C. 154(b) by 136 days.

(21) Appl. No.: 17/498,205

(22) Filed: Oct. 11, 2021

(65) Prior Publication Data

US 2022/0023952 A1 Jan. 27, 2022

Related U.S. Application Data

(62) Division of application No. 15/406,312, filed on Jan. 13, 2017, now Pat. No. 11,167,454.

(51) Int. Cl.
*B29C 64/153* (2017.01)
*B29C 64/141* (2017.01)
(Continued)

(52) U.S. Cl.
CPC ............ *B29C 64/153* (2017.08); *B22F 12/67* (2021.01); *B28B 1/001* (2013.01);
(Continued)

(58) Field of Classification Search
None
See application file for complete search history.

(56) References Cited

U.S. PATENT DOCUMENTS

| | | | |
|---|---|---|---|
| 3,567,120 A | 3/1971 | Suda et al. | |
| 4,011,036 A * | 3/1977 | Bichet | B29C 41/12 425/447 |

(Continued)

FOREIGN PATENT DOCUMENTS

| | | |
|---|---|---|
| CN | 101090787 A | 12/2007 |
| CN | 101128613 A | 2/2008 |

(Continued)

OTHER PUBLICATIONS

CN-102564314-A translation (Year: 2022).*

(Continued)

*Primary Examiner* — Xiao S Zhao
*Assistant Examiner* — Guy F Mongelli
(74) *Attorney, Agent, or Firm* — Dinsmore & Shohl LLP

(57) ABSTRACT

The present disclosure generally relates to additive manufacturing systems and methods involving a mechanism for feeding in a desired amount of fresh recoater blade. This can be accomplished by, for example, spooling the fresh blade material from a spool. This helps prevent work stoppage when a portion of a recoater blade becomes damaged. As such, the present disclosure also relates to a system and method for detecting whether a recoater blade is damaged, and if there is damage, then causing a fresh blade portion to be fed in.

18 Claims, 6 Drawing Sheets

(51) Int. Cl.
| | |
|---|---|
| *B29C 64/386* | (2017.01) |
| *B22F 12/67* | (2021.01) |
| *B33Y 30/00* | (2015.01) |
| *B28B 1/00* | (2006.01) |
| *B28B 17/00* | (2006.01) |
| *B29C 33/74* | (2006.01) |
| *B22F 10/28* | (2021.01) |
| *B22F 12/49* | (2021.01) |
| *B22F 12/52* | (2021.01) |
| *B22F 12/63* | (2021.01) |
| *B22F 12/90* | (2021.01) |
| *B22F 10/64* | (2021.01) |
| *B33Y 10/00* | (2015.01) |
| *B33Y 50/02* | (2015.01) |
| *B29C 33/70* | (2006.01) |

(52) U.S. Cl.
CPC .......... *B28B 17/0081* (2013.01); *B29C 33/74* (2013.01); *B29C 64/141* (2017.08); *B29C 64/386* (2017.08); *B33Y 30/00* (2014.12); *B22F 10/28* (2021.01); *B22F 10/64* (2021.01); *B22F 12/49* (2021.01); *B22F 12/52* (2021.01); *B22F 12/63* (2021.01); *B22F 12/90* (2021.01); *B29C 2033/705* (2013.01); *B29K 2883/00* (2013.01); *B33Y 10/00* (2014.12); *B33Y 50/02* (2014.12); *Y02P 10/25* (2015.11)

(56) References Cited

U.S. PATENT DOCUMENTS

| | | | |
|---|---|---|---|
| 4,863,538 | A | 9/1989 | Deckard |
| 5,460,758 | A | 10/1995 | Langer et al. |
| 5,895,622 | A | 4/1999 | Ramani et al. |
| 7,713,454 | B2 | 5/2010 | Larsson |
| 8,584,357 | B2 | 11/2013 | Richter et al. |
| 8,691,329 | B2 | 4/2014 | Qi et al. |
| 11,167,454 | B2 * | 11/2021 | Rockstroh .......... B28B 17/0081 |
| 2002/0015934 | A1 | 2/2002 | Rubbert et al. |
| 2002/0018854 | A1 | 2/2002 | McCarthy et al. |
| 2003/0070748 | A1 | 4/2003 | Ishigaki et al. |
| 2004/0029706 | A1 | 2/2004 | Barrera et al. |
| 2004/0054608 | A1 | 3/2004 | Liiri et al. |
| 2004/0094728 | A1 | 5/2004 | Herzog et al. |
| 2004/0164059 | A1 | 8/2004 | Brehm et al. |
| 2004/0170765 | A1 | 9/2004 | Ederer et al. |
| 2006/0118993 | A1 | 6/2006 | Awofeso et al. |
| 2006/0138751 | A1 | 6/2006 | Matsuno |
| 2006/0219163 | A1 | 10/2006 | Merot et al. |
| 2009/0152771 | A1 | 6/2009 | Philippi et al. |
| 2009/0271985 | A1 | 11/2009 | Lange |
| 2010/0196068 | A1 * | 8/2010 | Thayer ............... G03G 21/0029 399/351 |
| 2010/0323830 | A1 | 12/2010 | Blotteaux et al. |
| 2011/0223349 | A1 | 9/2011 | Scott |
| 2011/0278773 | A1 | 11/2011 | Bokodi et al. |
| 2012/0092724 | A1 * | 4/2012 | Pettis ................... B29C 64/386 358/1.15 |
| 2012/0211155 | A1 * | 8/2012 | Wehning ............ A61C 13/0018 156/380.9 |
| 2013/0101746 | A1 | 4/2013 | Keremes et al. |
| 2013/0161432 | A1 | 6/2013 | Manella et al. |
| 2014/0077422 | A1 | 3/2014 | Minick |
| 2014/0265049 | A1 | 9/2014 | Burris et al. |
| 2014/0348969 | A1 | 11/2014 | Scott |
| 2015/0165683 | A1 | 6/2015 | Cheverton et al. |
| 2015/0177158 | A1 | 6/2015 | Cheverton |
| 2015/0251352 | A1 | 9/2015 | Goto |
| 2015/0314373 | A1 * | 11/2015 | Mironets ................. B22F 3/003 419/30 |
| 2016/0069184 | A1 | 3/2016 | Ribic et al. |
| 2016/0074938 | A1 * | 3/2016 | Kitani ..................... B22F 12/37 219/76.12 |
| 2016/0121397 | A1 * | 5/2016 | Aydin ..................... B22F 12/67 118/708 |
| 2016/0144429 | A1 | 5/2016 | Mizutani |
| 2016/0221262 | A1 | 8/2016 | Das et al. |
| 2016/0236277 | A1 | 8/2016 | Doherty et al. |
| 2016/0311025 | A1 * | 10/2016 | Kaneko .................. B22F 12/90 |
| 2016/0318257 | A1 | 11/2016 | Brooks et al. |
| 2017/0001378 | A1 | 1/2017 | Zheng et al. |
| 2017/0310935 | A1 * | 10/2017 | Sinclair ................ B29C 64/245 |
| 2017/0333990 | A1 | 11/2017 | Garry |
| 2018/0200964 | A1 | 7/2018 | Rockstroh et al. |
| 2018/0354208 | A1 | 12/2018 | Crear et al. |
| 2018/0361662 | A1 * | 12/2018 | Paternoster ............ B33Y 10/00 |

FOREIGN PATENT DOCUMENTS

| | | | | |
|---|---|---|---|---|
| CN | 102564314 | A * | 7/2012 | |
| CN | 104690269 | A | 6/2015 | |
| CN | 105172145 | A | 12/2015 | |
| CN | 105408040 | A | 3/2016 | |
| CN | 105499571 | A | 4/2016 | |
| CN | 105555509 | A | 5/2016 | |
| CN | 205436226 | U | 8/2016 | |
| CN | 106003724 | A | 10/2016 | |
| DE | 19649865 | C1 | 2/1998 | |
| DE | 102014225124 | A1 * | 6/2015 | .......... B29C 64/106 |
| DE | 102015110264 | A1 | 12/2016 | |
| EP | 1769902 | A2 | 4/2007 | |
| EP | 2191922 | A1 | 6/2010 | |
| EP | 2202016 | A1 | 6/2010 | |
| EP | 2845918 | A1 * | 3/2015 | ............ B22F 3/1055 |
| JP | H01-308950 | A | 12/1989 | |
| JP | H05-176259 | A | 7/1993 | |
| JP | 2001150556 | A | 6/2001 | |
| JP | 2004325856 | A | 11/2004 | |
| JP | 2010520091 | A | 6/2010 | |
| JP | 2013141830 | A | 7/2013 | |
| JP | 2015168111 | A | 9/2015 | |
| JP | 2015193134 | A | 11/2015 | |
| KR | 20150133328 | A | 11/2015 | |
| KR | 101646773 | B1 | 8/2016 | |
| WO | 2014199149 | A1 | 12/2014 | |
| WO | 2016147681 | A1 | 9/2016 | |
| WO | 2016177516 | A1 | 11/2016 | |

OTHER PUBLICATIONS

EP 2845918-A2 translation (Year: 2023).*
DE-102014225124-A1 translation (Year: 2023).*
International Search Report and Written Opinion issued in connection with corresponding PCT Application No. PCT/US2017/065037 dated Mar. 28, 2018.
English Translation of Chinese office action for application 201780083324.8 dated Dec. 2, 2020 (20 pages).
English Translation of Japanese office action for application 2019-538195 dated Oct. 20, 2020 (6 pages).
European Extended Search Report for EP Application No. 178914146.4 dated Sep. 7, 2020 (8 pages).
European Patent Office Action for Application No. 17891416.4 dated Sep. 26, 2022 (6 pages).
Third Office Action for China Application No. 201780083324.8 dated Nov. 16, 2021.

* cited by examiner

APPARATUSES FOR CONTINUOUSLY REFRESHING A RECOATER BLADE FOR ADDITIVE MANUFACTURING INCLUDING A BLADE FEED UNIT AND ARM PORTION

CROSS-REFERENCE TO RELATED APPLICATIONS

The present specification is a divisional application of U.S. application Ser. No. 15/406,312 filed Jan. 13, 2017 and entitled "Method and Apparatus for Continuously Refreshing a Recoater Blade for Additive Manufacturing," the entirety of which is incorporated by reference herein.

INTRODUCTION

The present disclosure generally relates to a method of making a part by additive manufacturing, including by Direct Metal Laser Melting ("DMLM"), and an apparatus for performing the method.

BACKGROUND

A description of a typical laser powder bed fusion process is provided in German Patent No. DE 19649865, which is incorporated herein by reference in its entirety. AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an energy directing device comprising an energy source that emits an energy beam, for example, an electron beam or a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758, which are incorporated herein by reference, describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

FIG. 1 is schematic diagram showing a cross-sectional view of an exemplary conventional system 100 for direct metal laser sintering ("DMLS") or direct metal laser melting (DMLM). The apparatus 100 builds objects, for example, the part 122, in a layer-by-layer manner by sintering or melting a powder material (not shown) using an energy beam 136 generated by a source 120, which can be, for example, a laser for producing a laser beam, or a filament that emits electrons when a current flows through it. The powder to be melted by the energy beam is supplied by reservoir 126 and spread evenly over a powder bed 112 using a recoater arm 116 travelling in direction 134 to maintain the powder at a level 118 and remove excess powder material extending above the powder level 118 to waste container 128. The energy beam 136 sinters or melts a cross sectional layer of the object being built under control of an irradiation emission directing device, such as a galvo scanner 132. The galvo scanner 132 may comprise, for example, a plurality of movable mirrors or scanning lenses. The speed at which the laser is scanned is a critical controllable process parameter, impacting how long the laser power is applied to a particular spot. Typical laser scan speeds are on the order of 10 to 100 millimeters per second. The build platform 114 is lowered and another layer of powder is spread over the powder bed and object being built, followed by successive melting/sintering of the powder by the laser 120. The powder layer is typically, for example, 10 to 100 microns. The process is repeated until the part 122 is completely built up from the melted/sintered powder material.

The laser 120 may be controlled by a computer system including a processor and a memory.

The computer system may determine a scan pattern for each layer and control laser 120 to irradiate the powder material according to the scan pattern. After fabrication of the part 122 is complete, various post-processing procedures may be applied to the part 122. Post processing procedures include removal of excess powder by, for example, blowing or vacuuming. Other post processing procedures include a stress release process. Additionally, thermal and chemical post processing procedures can be used to finish the part 122.

Powder beds are commonly used in laser bed additive manufacturing techniques. These techniques generally require a step of providing a thin layer of powder over a build plate within the additive manufacturing apparatus. In one example, a powder dispenser 201 is provided that pushes an amount of powder (e.g., CoCr) upward into the build chamber where a roller or arm 202 spreads the powder over the build plate 103. FIG. 1. A laser heats the powder in a desired pattern corresponding to a cross section of a part, sintering or melting the powder to form a solid cross section slice on the build plate 203. The build plate is lowered and the powder dispenser and roller or arm redistributes a thin layer of powder over the build plate. The laser then heats the powder building on the earlier deposited pattern of fused material, thereby making successive layers in the additive manufacturing process.

Another way that a thin layer of powder is provided upon a build plate is through a powder hopper 301 used in conjunction with a recoater arm/temporary hopper 202. FIG. 2. The recoater arm/temporary hopper 302 spreads a thin layer of powder over the build plate 303 by moving across the build plate and dropping powder in a controlled manner to provide a thin layer of powder. This process is repeated with each laser writing step and lowering of the build plate in the additive manufacturing process.

In the existing technology a recoater arm 400 is provided with a hard, single use recoater blade 401. During the process of spreading the powder, the existing recoater blades can be damaged by edges or protrusions in the object that can damage the blade during the process of spreading the powder. This requires stopping the process, uninstalling the damaged blade, and replacing the blade, which is time-consuming and costly. Conversely, the existing recoater blades can damage the part during the process of spreading the powder, which may result in significant waste. Therefore there is a need for a recoater blade that is less prone to cause damage, less vulnerable to damage, and that does not have to be uninstalled and replaced if it becomes damaged.

SUMMARY

The presently disclosed invention relates to methods and apparatuses for making a desired object by additive manufacturing, for example by direct metal laser melting ("DMLM"). In one embodiment of the presently disclosed method at least part of a layer of powder in a powder bed is irradiated to form an object, a subsequent layer of powder is provided over the powder bed by passing a recoater arm over the powder bed to provide a substantially even layer of powder, and the process is repeated until the desired object is formed. The recoater arm comprises an arm portion and a blade portion below the arm portion, the blade portion protruding from the arm portion and adapted to create the substantially even layer of powder. The material for the blade portion can be, for example, silicone rubber, plastic, or the same material as the powder. In one aspect of the presently disclosed method fresh blade material can be fed in during the additive manufacturing process, i.e. without work stoppage.

In one embodiment of the presently disclosed method the blade portion is analyzed to determine whether it is damaged. In another aspect, the object is analyzed to determine whether it is damaged. If the blade portion is damaged, then fresh blade material can be fed in to replace the damaged portion. The fresh blade material can be fed by, for example, a blade feed unit. One example of a blade feed unit is a payout spool.

One embodiment of the presently disclosed apparatus comprises a powder bed around a build plate, an energy directing device, a blade feed unit, and a recoater arm with an arm portion and a blade portion. The energy directing device may be, by way of non-limiting example, a laser or an electron beam apparatus such as an electron gun. The blade portion material can be any material suitable for making an object by DMLM, which by way of non-limiting example may be silicone rubber or plastic. In one aspect of the presently disclosed apparatus the apparatus comprises a payout spool. The payout spool comprises fresh blade material. The apparatus may also comprise a blade receiving unit for collecting used blade material. In one embodiment of the presently disclosed apparatus, the apparatus comprises a system for determining whether the blade portion is damaged. In one embodiment of the presently disclosed apparatus, the apparatus comprises a system for determining whether the object is damaged.

DETAILED DESCRIPTION

Figure 1:
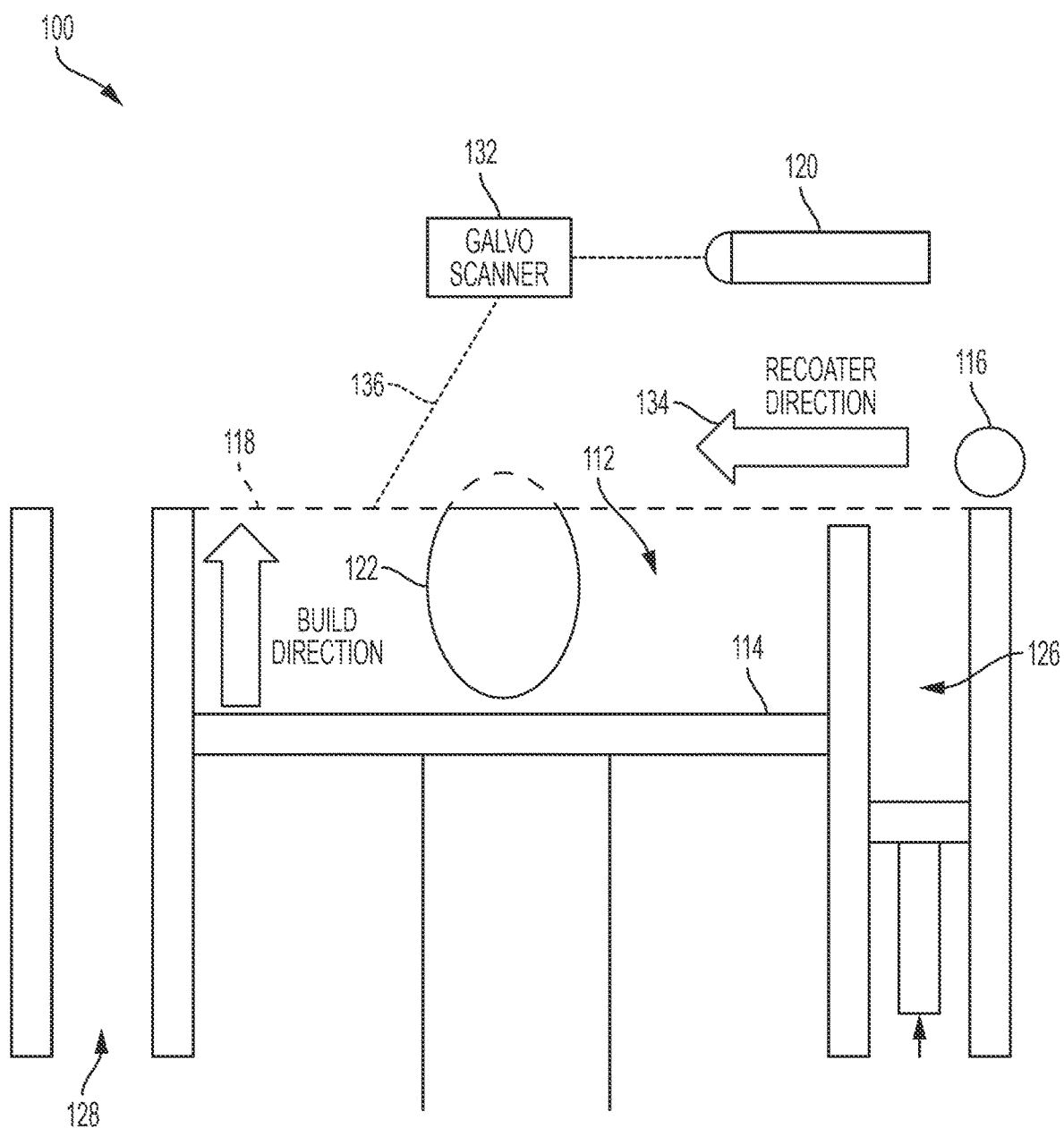
FIG. 1 is a powder bed containing an object made by an additive manufacturing process according to the prior art.

The detailed description set forth below in connection with the appended drawings is intended as a description of various configurations and is not intended to represent the only configurations in which the concepts described herein may be practiced.

In an embodiment, the invention relates to methods of making a desired object by additive manufacturing, including steps of distributing a portion of powder over a build plate by spreading the powder with a recoater arm comprising an arm portion and a blade portion, focusing an energy beam to make a fused region, repeating until the desired object is formed, and feeding in fresh blade material at least once during the process. The powder is preferably a metallic alloy, polymer, or ceramic powder. Unused powder can be collected in a powder receptacle, and recycled if desired. The portion of powder may be provided by, for example, depositing the powder via a hopper. The step of focusing an energy beam can be accomplished with, for example, a laser or an electron beam apparatus such as an electron gun.

In an embodiment, the invention relates to methods of making a desired object by additive manufacturing, including distributing a portion of powder over a build plate by spreading the powder with a recoater arm comprising an arm portion and a blade portion, focusing an energy beam to make an object, feeding new blade material, and repeating until the desired object is formed. Feeding new blade material can be accomplished by, for instance, spooling the fresh blade material into the recoater arm using a payout spool and/or a takeup spool. In one aspect, the presently disclosed method includes checking if either the object or the blade is damaged. In another aspect fresh blade material is fed into the recoater arm if the blade portion is damaged. In another aspect, used blade material may be collected if desired. Blade material can be collected by, for instance, depositing the blade material in a blade material receptacle, or by collecting it in a takeup spool. The step of checking whether the blade or the object is damaged can be performed by any means capable of inspecting the blade or object, for instance using a camera. The camera may transfer data to a computer.

In an embodiment, the invention relates to an apparatus for making a desired object by additive manufacturing comprising a powder bed area around a build plate, an energy directing device, a recoater arm with an arm portion and a blade portion, and a blade material feed unit. The blade portion may be made of a material such as silicone rubber, plastic, or a material suitable for making an object by DMLM. The energy directing device may be, for example, a laser or an electron beam. The blade material feed unit may be, for example, a payout spool. The apparatus may further comprise a blade material receiving unit. The blade material receiving unit may be, for example, a takeup spool or a blade material receptacle.

In an embodiment, the invention relates to an apparatus for making a desired object by additive manufacturing comprising a powder bed area around a build plate, an energy directing device, a system for checking if either the recoater blade or the part is damaged, and a recoater arm with an arm portion and a blade portion. The system for checking if either the recoater blade or the part is damaged may be any system capable of visually inspecting the recoater blade or part, for instance a camera. The camera may transfer data to a computer.

FIG. 1 shows an exemplary prior art system for DMLM 100. The part 122 is built layer-by-layer by sintering or melting powder material in the shape of a layer of the object. The sintering or melting is performed using an energy beam 136 generated by an energy source such as a laser 120 and controlled by a galvo scanner 132. The powder to be melted by the energy beam is supplied by a reservoir 126 and then spread evenly over a build plate 114 using a recoater arm 116 traveling in a direction 134 to maintain the powder at a level 118 and remove excess powder material extending above the powder level 118. Some of the excess powder material is deposited in waste container 128. Then the build plate 114 is lowered and another layer of powder is spread over the build plate and the object being built, powder material is melted or sintered by the laser 120, and the process is repeated until the part 122 is complete.

Figure 2:
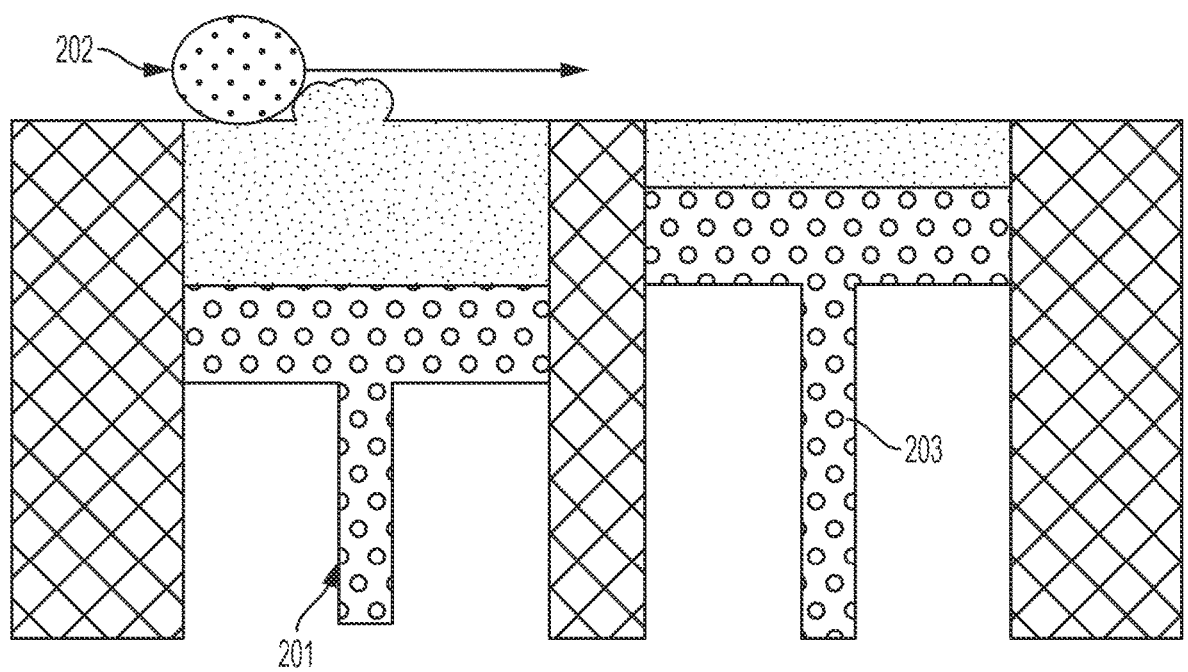
FIG. 2 is a schematic view of a conventional powder bed additive manufacturing process using a recoater arm to distribute powder in a horizontal fashion over a build plate.

FIG. 2 shows powder bed for additive manufacturing according to the prior art. A powder dispenser 201 is provided that pushes an amount of powder (e.g., CoCr) upward into the build chamber where a roller or arm 202 spreads the powder over the build plate 203. A laser heats the powder in a desired pattern corresponding to a cross section of a part, sintering or melting the powder to form a solid cross section slice on the build plate 203. The build plate is lowered and the powder dispenser and roller or arm redistributes a thin layer of powder over the build plate. The laser then heats the powder building on the earlier deposited pattern of fused material, thereby making successive layers in the additive manufacturing process.

Figure 3:
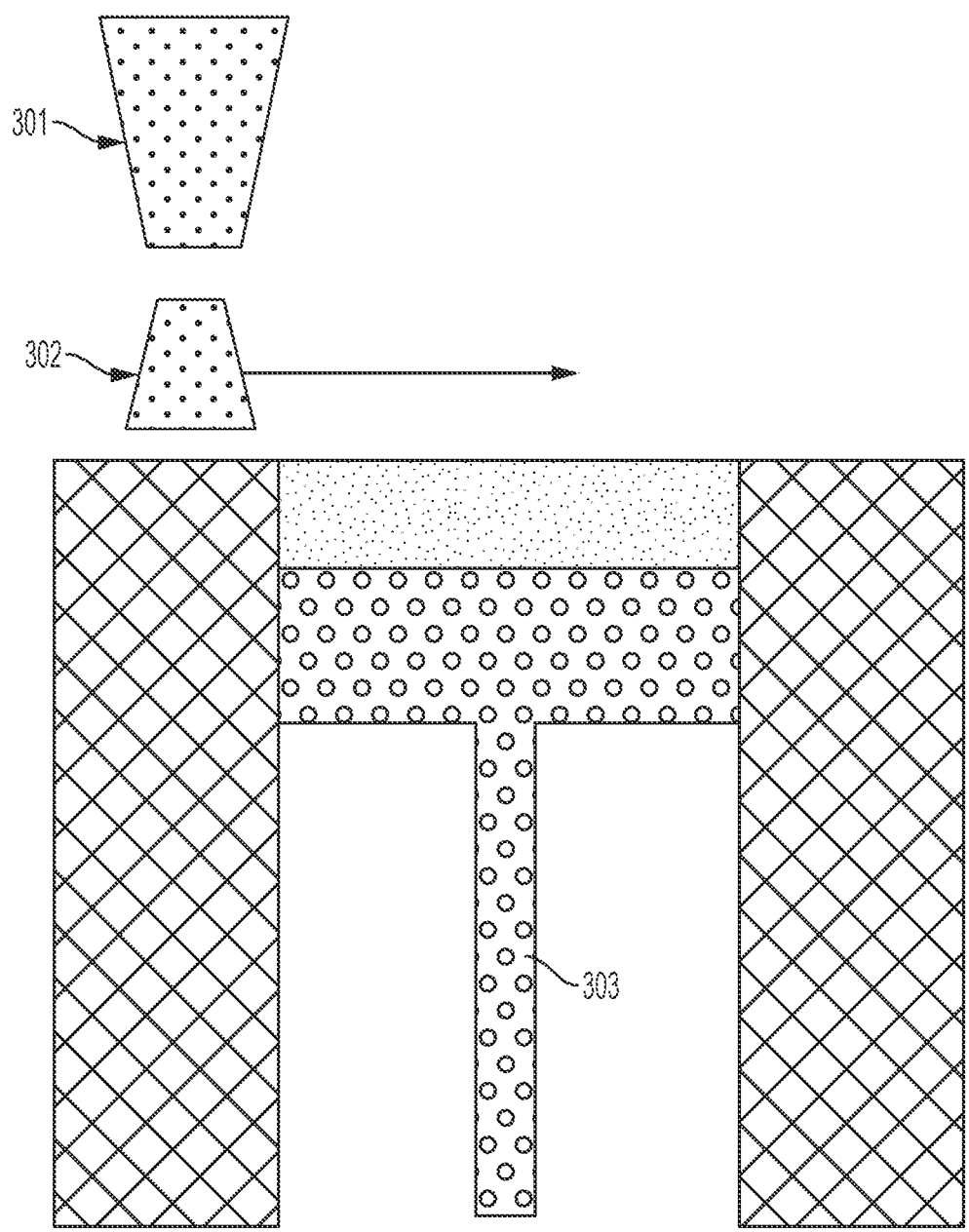
FIG. 3 is a schematic view of a conventional additive manufacturing apparatus using a hopper to distribute powder over a build plate.

FIG. 3 shows a powder bed and recoating system for additive manufacturing according to the prior art. A powder hopper 301 used in conjunction with a recoater arm/temporary hopper 302. The recoater arm/temporary hopper 302 spreads a thin layer of powder over the build plate 303 by moving across the build plate and dropping powder in a controlled manner to provide a thin layer of powder. This process is repeated with each laser writing step and lowering of the build plate in the additive manufacturing process.

Figure 4:
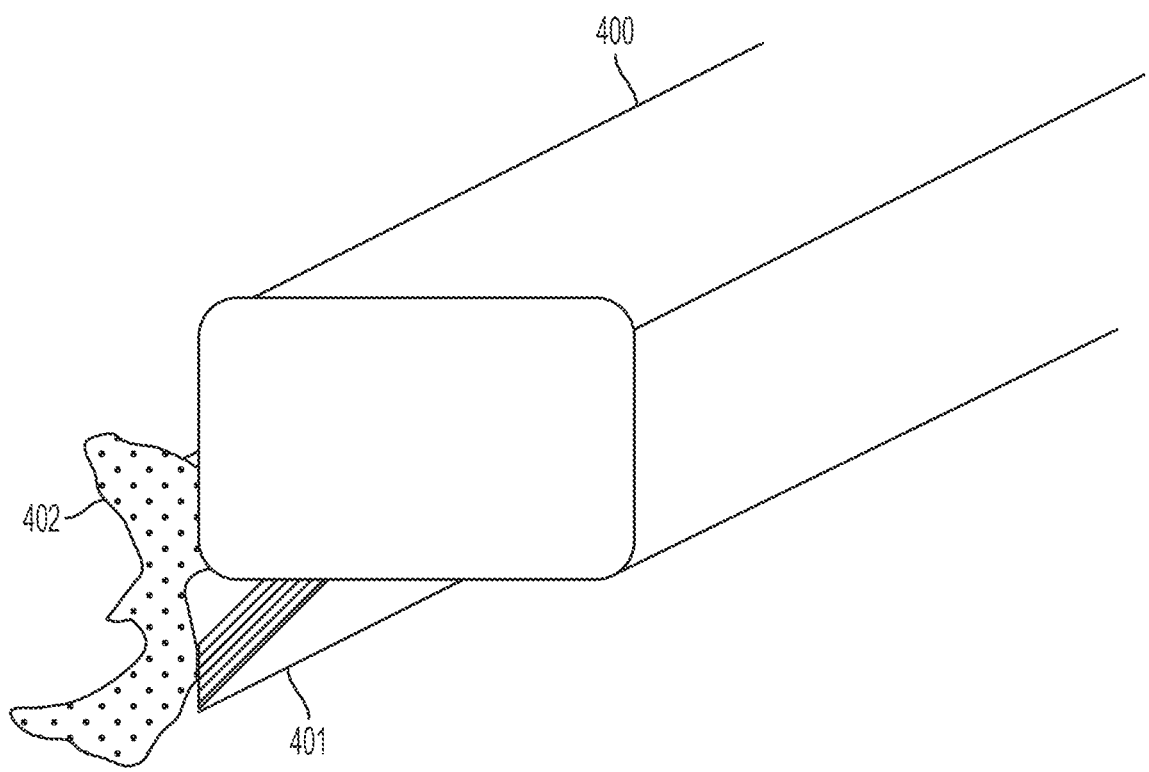
FIG. 4 is an illustration of a recoater arm with a recoater blade according to the prior art.

FIG. 4 shows a recoater arm for use in an additive manufacturing process according to the prior art. There is a recoater arm 400 with a single use recoater blade 401 and powder 402.

Figure 5:
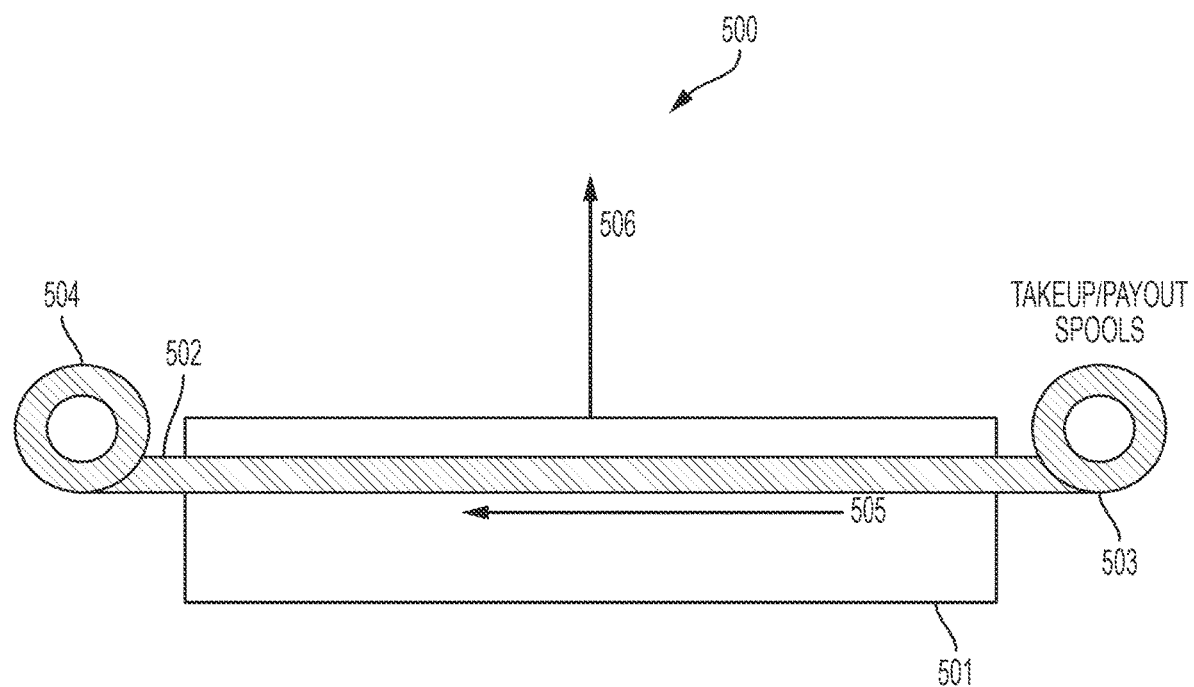
FIG. 5 is an illustration of a recoater arm with an arm portion and blade portion, and takeup/payout spools according to an embodiment of the invention.

FIG. 5 shows a recoating system 500 with recoater arm 501 and a continuous feed recoater blade 502 according to an embodiment of the invention. The recoating system in FIG. 5 has a payout spool 503 and a takeup spool 504. The recoater blade 502 is fed in a direction 505. The recoater blade 502 is moved in a direction 506 to provide a substantially even layer of powder.

Figure 6:
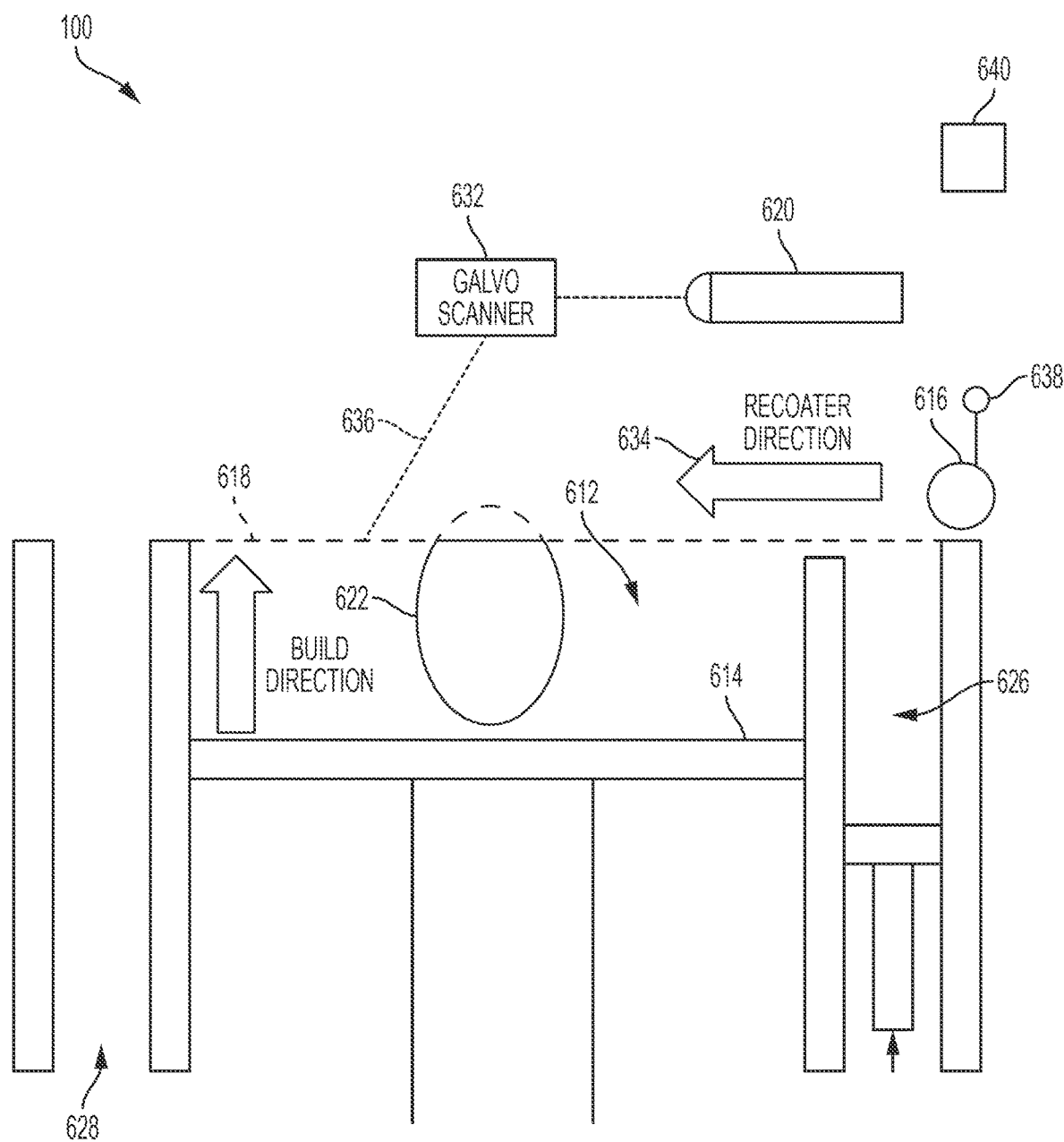
FIG. 6 is a powder bed containing an object made by an additive manufacturing process according to an embodiment of the invention.

FIG. 6 shows an exemplary additive manufacturing system with a continuous feed recoater blade according to an embodiment of the invention. The part 622 is built layer-by-layer by sintering or melting powder material in the shape of a layer of the object. The sintering or melting is performed using an energy beam 636 generated by an energy source such as a laser 620 and controlled by a galvo scanner 632. The powder to be melted by the energy beam is supplied by a reservoir 626 and then spread evenly over a build plate 614 using a recoater arm 616 with a continuous feed recoater blade traveling in a direction 634 to maintain the powder at a level 618 and remove excess powder material extending above the powder level 618. Some of the excess powder material is deposited in waste container 628. Then the build plate 614 is lowered and another layer of powder is spread over the build plate and the object being built, powder material is melted or sintered by the laser 620, and the process is repeated until the part 622 is complete. There is also a camera 638 attached to the recoater arm that is capable of transferring data to a computer 640, which allows for detection of whether the object or the continuous feed recoater blade becomes damaged.

The invention claimed is:

1. An apparatus comprising:
   a powder bed area around a build plate;
   an energy directing device;
   a recoater arm comprising an arm portion and a blade portion, wherein the blade portion is below the arm portion and protrudes from the arm portion;
   a powder dispensing unit; and
   a blade feed unit comprising blade material, wherein the blade feed unit is a payout spool.

2. The apparatus according to claim 1, wherein the blade portion is made of material suitable for making a part via direct laser metal melt additive manufacturing.

3. The apparatus according to claim 1, wherein the blade feed unit comprises fresh blade material.

4. The apparatus according to claim 1, further comprising a blade receiving unit.

5. The apparatus according to claim 4, wherein the blade receiving unit is a takeup spool.

6. The apparatus according to claim 4, wherein the blade receiving unit is a receptacle.

7. The apparatus according to claim 1, further comprising a system capable of detecting whether the blade portion is damaged.

8. The apparatus according to claim 7, wherein the system comprises a camera and a computer.

9. The apparatus according to claim 1, wherein the powder dispensing unit is a hopper.

10. An apparatus comprising:
    a powder bed area around a build plate;
    an energy directing device;
    a recoater arm comprising an arm portion and a continuous feed recoater blade having a blade portion, wherein the blade portion is below the arm portion and protrudes from the arm portion;
    a powder dispensing unit;
    a blade feed unit comprising blade material; and
    a camera for detecting whether the blade portion or the object is damaged, the camera being attached to the recoater arm.

11. The apparatus according to claim 10, wherein the blade portion is made of material suitable for making a part via direct laser metal melt additive manufacturing.

12. The apparatus according to claim 10, wherein the blade feed unit is a payout spool.

13. The apparatus according to claim 10, wherein the blade feed unit comprises fresh blade material.

14. The apparatus according to claim 10, further comprising a blade receiving unit.

15. The apparatus according to claim 14, wherein the blade receiving unit is a takeup spool.

16. The apparatus according to claim 14, wherein the blade receiving unit is a receptacle.

17. The apparatus according to claim 10, wherein the powder dispensing unit is a hopper.

18. The apparatus according to claim 10, wherein the apparatus further comprises a computer.

\* \* \* \* \*